United States Patent
Rosenvard

(10) Patent No.: US 8,841,796 B2
(45) Date of Patent: Sep. 23, 2014

(54) TURBINE FARM HAVING AN AUXILIARY POWER SUPPLY

(75) Inventor: Paw Rosenvard, Gjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 811 days.

(21) Appl. No.: 13/119,221

(22) PCT Filed: Sep. 18, 2009

(86) PCT No.: PCT/EP2009/006770
§ 371 (c)(1),
(2), (4) Date: Apr. 6, 2011

(87) PCT Pub. No.: WO2010/031575
PCT Pub. Date: Mar. 25, 2010

(65) Prior Publication Data
US 2011/0175355 A1    Jul. 21, 2011

Related U.S. Application Data

(60) Provisional application No. 61/192,517, filed on Sep. 19, 2008.

(30) Foreign Application Priority Data

Sep. 19, 2008    (EP) .................................... 08253082

(51) Int. Cl.
*H02J 3/14*    (2006.01)
*H02J 9/00*    (2006.01)
*F03D 7/04*    (2006.01)
*H02J 3/38*    (2006.01)

(52) U.S. Cl.
CPC . *F03D 7/048* (2013.01); *H02J 3/14* (2013.01); *Y02E 10/723* (2013.01); *F05B 2270/1074* (2013.01); *H02J 3/386* (2013.01); *F05B 2260/76* (2013.01); *Y02E 10/763* (2013.01); *Y02E 10/725* (2013.01); *F05B 2270/1033* (2013.01)
USPC ................... 307/40; 307/11; 307/18; 307/31; 307/32; 307/38; 307/39; 307/41; 307/43; 307/116; 307/125

(58) Field of Classification Search
CPC .................. H02J 3/14; H02J 9/00; H02J 9/02
USPC ........ 307/11, 18, 31–32, 38–41, 43, 116, 125
See application file for complete search history.

(56) References Cited

U.S. PATENT DOCUMENTS 4,565,929 A     1/1986  Baskin et al.
7,298,055 B2 *  11/2007 Galloway et al. ............... 290/44

(Continued)

FOREIGN PATENT DOCUMENTS

EP    1752659 A2    2/2007
EP    1903213 A2    3/2008

OTHER PUBLICATIONS

European Patent Office, Search Report and Written Opinion issued in related international application No. PCT/EP2009/006770 dated May 4, 2010.

(Continued)

*Primary Examiner* — Adi Amrany
(74) *Attorney, Agent, or Firm* — Patterson & Sheridan, LLP

(57) ABSTRACT

A turbine farm comprises a plurality of individual turbines each having an auxiliary component circuit. The farm further comprises; a master transformer arranged to be coupled between each of the plurality of individual turbines and an electrical grid and an auxiliary transformer coupled between the sub-station transformer and the auxiliary component circuit in each of the individual turbines. When in use power is transmitted from the sub-station transformer back to each auxiliary component circuit.

20 Claims, 5 Drawing Sheets

(56) References Cited

U.S. PATENT DOCUMENTS

| | | | |
|---|---|---|---|
| 7,602,075 B2* | 10/2009 | Erdman et al. | 290/44 |
| 7,880,335 B2* | 2/2011 | Altenschulte | 307/68 |
| 8,188,610 B2* | 5/2012 | Scholte-Wassink | 290/44 |
| 2005/0242233 A1* | 11/2005 | Battisti | 244/58 |
| 2007/0001461 A1* | 1/2007 | Hopewell | 290/44 |
| 2009/0134625 A1* | 5/2009 | Altenschulte | 290/44 |
| 2010/0019574 A1* | 1/2010 | Baldassarre et al. | 307/23 |
| 2012/0146423 A1* | 6/2012 | Bodewes et al. | 307/84 |
| 2012/0217824 A1* | 8/2012 | Gupta et al. | 307/145 |
| 2013/0229056 A1* | 9/2013 | Teichmann | 307/18 |

OTHER PUBLICATIONS

European Patent Office, Office Action issued in related European application No. 08253082.5 dated May 29, 2009.

* cited by examiner

TURBINE FARM HAVING AN AUXILIARY POWER SUPPLY

The present invention relates to a turbine farm having an auxiliary power supply. It is particularly related to, but in no way limited to, a wind turbine farm having an auxiliary component circuit power supply.

In the electrical power generation industry turbines are used to generate electrical power for transmission to a user supply network, known as a grid. Each form of turbine has its own issues during manufacturing and operation. For example, wind turbines are normally erected in clusters, known as farms, in locations, which have undergone a rigorous selection process. This selection process normally places wind turbine farms at a significant distance from the end users of the electricity that they will generate. This is due in part to the need for locations with appropriate weather conditions. However, sites are also chosen where the erection of a turbine farm or wind farm is less likely to be objected to due to the scale of modern wind turbines, which can be up to 120 meters high. This makes the manufacturing, transportation and erection of wind turbines logistically challenging.

Individual wind turbines also have a number of weight constraints and their design, construction and operation have to be undertaken with those weight constraints in mind. In particular, the design of the components that will be housed in the turbine nacelle must conform to rigid weight limitations, both for transportation on public highways to the site at which the turbine will be erected and, for safety reasons, during use.

Therefore, turbines have been designed for some considerable time now with a view to minimising all excess weight in the nacelle. Consequently, no reduction in weight has been considered to be too small to be undertaken in wind turbine design.

Also, given the remote locations at which turbine farms are placed there is also a need for the supply of power to each turbine during its erection and commissioning.

The components in the nacelle include those components specifically involved in the generation of electrical power and those components which are of a secondary nature, which are known as auxiliary components. All of the aforementioned components are described in detail below with reference to FIGS. 2 and 3.

With traditional wind turbines the power for the auxiliary components is drawn from the main transformer 13 (see FIG. 3). An output of the main transformer 13, in each turbine 2, is coupled to the main circuit, which is herein defined as the circuit from each turbine 2 to the utility grid circuitry 34, where power can be produced by the turbine or supplied from the grid when there is low wind. If the main circuit goes off-line for any reason then the auxiliary components will also lose power. This makes it very difficult to diagnose and solve the problems which lead to the loss of generator power. If the power loss is due to a grid outage, the turbine will be without light, control, operation or maintenance i.e. there is no yawing, lubrication, heating, service lift and light. It also means that simple practicalities are also made problematical. For example, there will be no power to the lights, after the required emergency light time has elapsed (usually 1 hours), within a nacelle if the main circuit goes off-line, which is a significant problem in the day to day maintenance and error correction for wind turbines. Today, if a turbine is faulty a diesel generator must be brought to the wind farm and coupled to the generator in question in order to power the auxiliary component circuit, before the problem with the turbine, or other external problem, can be diagnosed and solved. Also, during installation and erection the grid is sometime the last part to be completed and each turbine in a wind farm must be ready before the grid supply is switch on.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a turbine farm comprising a plurality of individual turbines each of which comprises an auxiliary component circuit; a main circuit arranged to be coupled between each of the plurality of individual turbines and an electrical grid; and an auxiliary transformer coupled between the main circuit and the auxiliary component circuit in each of the individual turbines so as to transmit power from each turbine back to each auxiliary component circuit.

In this embodiment the auxiliary component circuit in each turbine includes one or more of a light source, a yaw motor and a temperature control mechanism.

In this embodiment the auxiliary component transformer has only two sets of windings and the turbine farm further comprises a back up power supply arranged for coupling to the auxiliary transformer.

Most preferably, the back up power supply is a diesel generator which is arranged to be activated automatically if power ceases to be transmitted by the sub-station transformer Preferably, there is provided a control processor which is arranged to intelligently control the operation of the components of an auxiliary component circuit in order to minimise power consumption, by utilising only a sub-set of the components at any one time.

In this embodiment the turbine farm further comprises a master controller which controls the operation of all of the auxiliary component circuits within the turbine farm collectively.

In this embodiment each turbine is a wind turbine. Most preferably, for each turbine the generator and substantially all of the auxiliary component circuit are housed within a wind turbine nacelle.

Preferably, the main circuit includes a sub-station transformer having only two sets of windings, which are arranged to couple power from the generator to the grid.

According to a second aspect of the present invention there is provided a method of operating a turbine farm comprising a plurality of individual turbines each of which comprises an auxiliary component circuit; a main circuit arranged to be coupled between each of the plurality of individual turbines and an electrical grid; and an auxiliary transformer coupled between the main circuit and the auxiliary component circuit in each of the individual turbines, the method comprising directing current to power the auxiliary component circuit in each turbine from each turbine via the auxiliary transformer and back to each auxiliary component circuit.

Preferably, the method further comprises intelligently controlling the operation of the components of the auxiliary component circuit in order to minimise power consumption, by utilising only a sub-set of the components at any one time.

In this embodiment the power consumption of the auxiliary component circuit is monitored and an additional component is activated only when that activation does not cause the power consumption to exceed a predetermined limit.

Most preferably, an additional component is activated only when that activation does not cause the power consumption to exceed a predetermined limit for more than a predetermined amount of time.

Still more preferably, the control of the components within the auxiliary component circuits is controlled in the whole turbine farm collectively.

According to a further aspect of the present invention there is provided one or more tangible device-readable media with device-executable instructions for operating a turbine farm comprising a plurality of individual turbines each of which comprises an auxiliary component circuit; a main circuit arranged to be coupled between each of the plurality of individual turbines and an electrical grid; and an auxiliary transformer coupled between the main circuit and the auxiliary component circuit in each of the individual turbines, the instructions comprising directing current from each turbine to power the auxiliary component circuit in each turbine via the auxiliary transformer back to each auxiliary component circuit.

Preferably, the instructions include intelligently controlling the operation of the components of the auxiliary component circuit in order to minimise power consumption, by utilising only a sub-set of the components at any one time.

In this embodiment the power consumption of the auxiliary component circuit is monitored and an additional component is activated only when that activation does not cause the power consumption to exceed a predetermined limit.

Most preferably, the additional component is activated only when that activation does not cause the power consumption to exceed a predetermined limit for more than a predetermined amount of time.

More preferably, control of the components within the auxiliary component circuits is controlled in the whole turbine farm collectively.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

Embodiments of the invention will be described, by way of example, with reference to the following drawings, in which.

Figure 1:
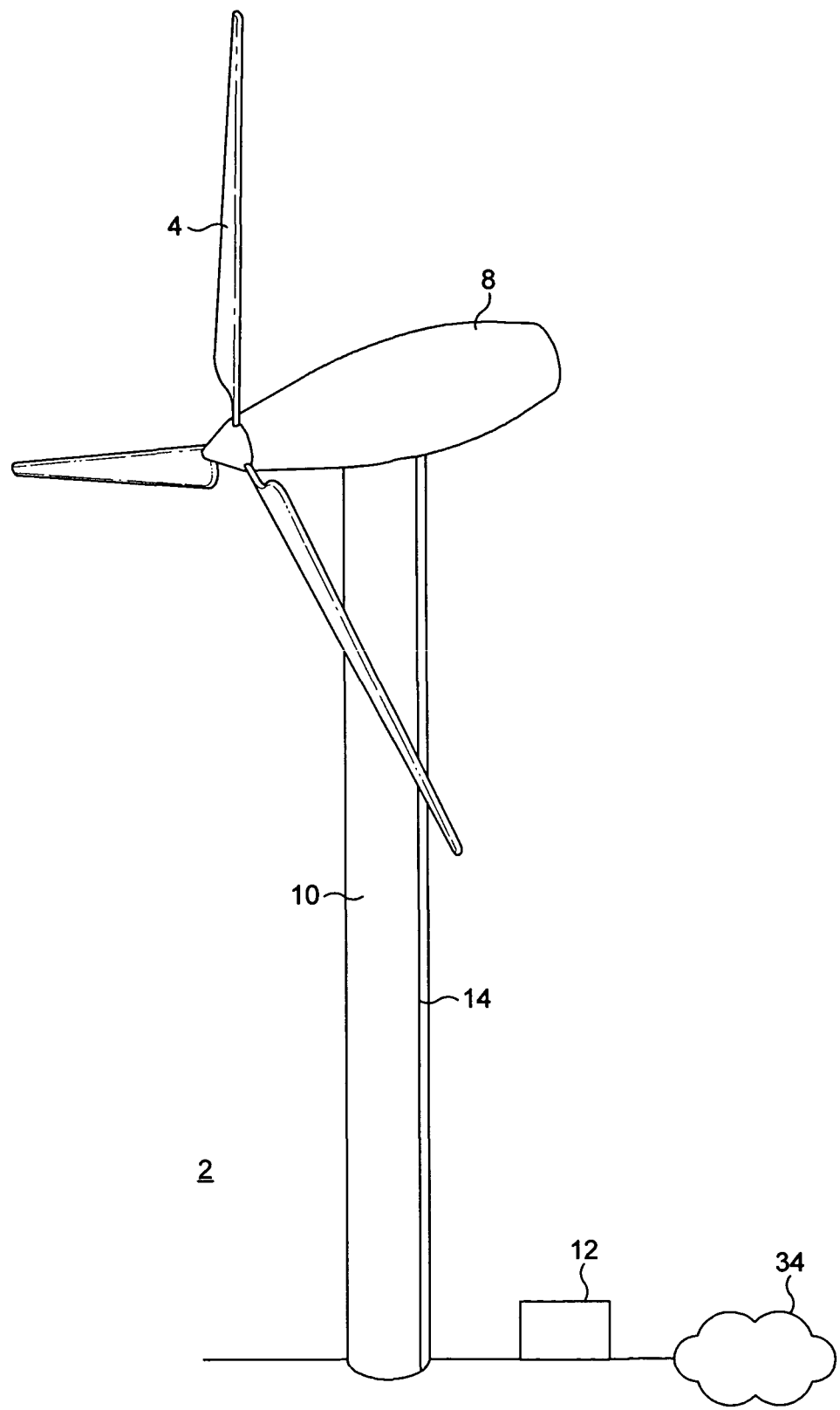
FIG. 1 is a schematic diagram of the exterior of a wind turbine suitable for use in prior art wind farms.

Common reference numerals are used throughout the figures to indicate similar features.

Embodiments of the present invention are described below by way of example only. These examples represent the best ways of putting the invention into practice that are currently known to the Applicant although they are not the only ways in which this could be achieved.

Figure 2:
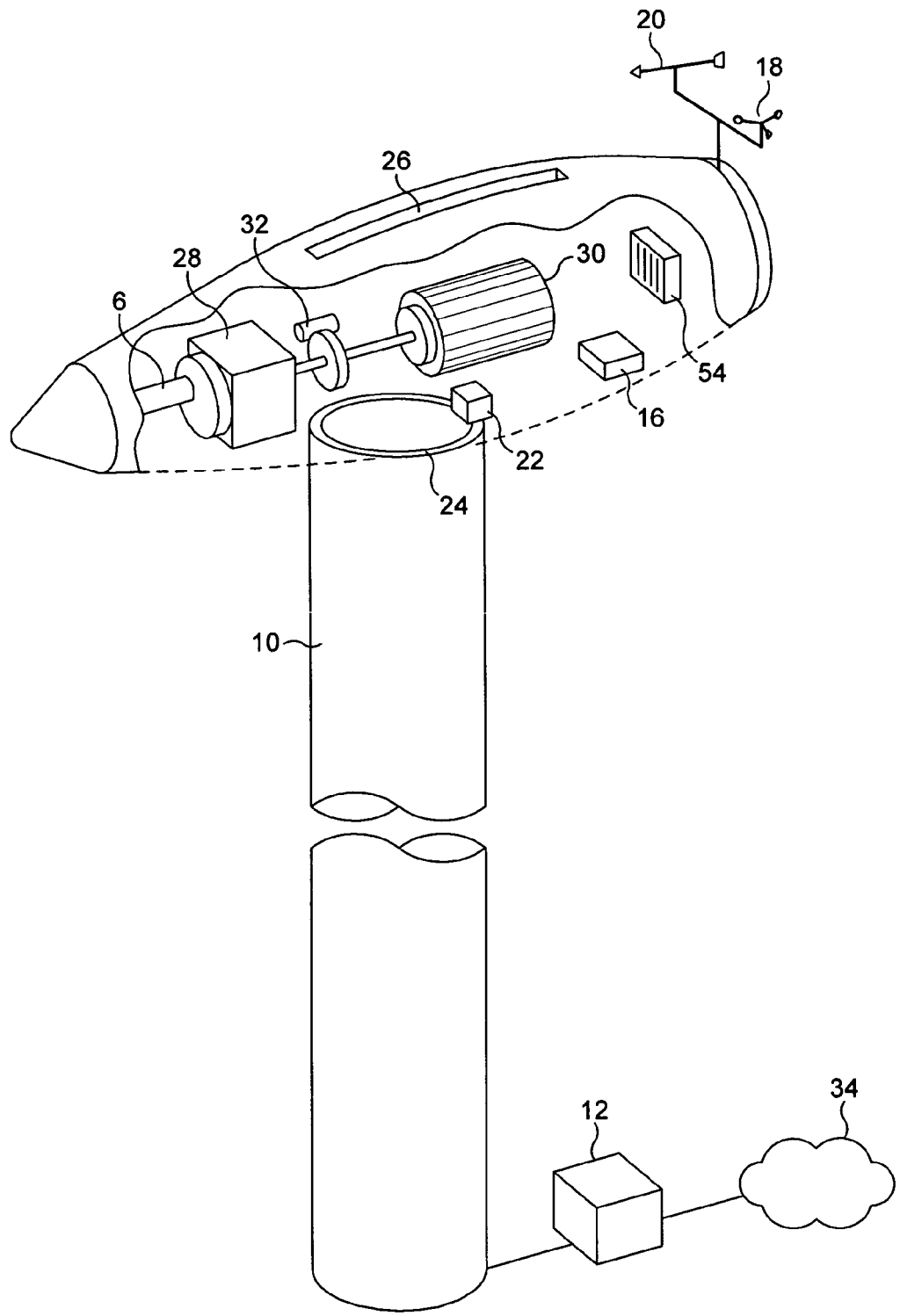
FIG. 2 is a schematic diagram of the interior of the wind turbine of FIG. 1.

Regarding the figures, FIG. 1 illustrates a schematic representation of the exterior of a known wind turbine 2. FIG. 1 illustrates the turbine rotor 4, which is coupled to the main shaft 6 (FIG. 2) of the turbine 2. The nacelle 8 houses the bulk of the components of the turbine, as can be seen in FIG. 2. The nacelle 8 is in turn supported by the turbine tower 10. The turbine 2 also has a sub-station transformer 12, which is positioned at ground level adjacent the tower 10 in this particular example, although alternative positions for the transformer 2 can be utilised including within the nacelle 8, as is known in the art. Current flows from the turbine 2 to the transformer 12 through cables 14.

FIG. 2 illustrates the key primary and auxiliary components of the turbine 2, which are housed within or adjacent the nacelle 8.

The auxiliary components include a wind turbine controller 16, which is a computer processor arranged to control the operation of the wind turbine 2. The controller 16 controls the yawing of the nacelle 8 against the wind and allows the wind turbine rotor 4 to start when there is sufficient wind to generate power. The controller 16 obtains information on which to make these decisions from sensors including, in this embodiment, an anemometer 18 which measures wind speed and a wind vane 20 which measures wind direction. However, the specific means by which these decisions are made are will known in the art and are not specifically relevant to the invention herein so they will not be described further in this document.

The controller 16 controls the yaw of the nacelle 8 through a yaw motor 22 which in turn rotates the nacelle 8 on a yaw bearing 24 so as to turn the rotor 4 up against the wind. Again this mechanism is well known in the industry and will not be described further herein.

The controller 16 also controls the lighting system 26 which provides light within the nacelle 8 and a temperature control mechanism 54.

The generation of power from a wind turbine 2 is also well known and it is therefore sufficient merely to include an overview herein. The rotor 4 is coupled to a main shaft 6, which in turn is coupled to a gear 28. The rotor 4 and main shaft 6 rotate at approximately 22 revolutions per minute, which the gear 28 converts to approximately 1500 revolutions per minute for rotation of a rotor within the generator 30. There is a brake 32 for controlling the rotation within the system and which can stop rotation, for example, to enable repairs to the turbine. Current from the generator 30 is transmitted to the sub-station transformer 12, along cables 14, from which the grid 34 is fed.

In particular current from the generator 30 is fed to a first set of windings 38 of the sub-station transformer 12. For example, the generator may be a 3 MW generator which produces 1,000V of electrical power at a few kAmps. Power for the grid is taken from a second set of windings 40 at approximately 6 to 36 kV and a couple of hundred Amps. Power to run the auxiliary components associated with the turbine is taken from a third set of windings 42 at, in this embodiment, approximately 400V and some hundreds of Amps. The auxiliary components for this purpose are electrically coupled to an auxiliary component circuit 44.

Figure 3:
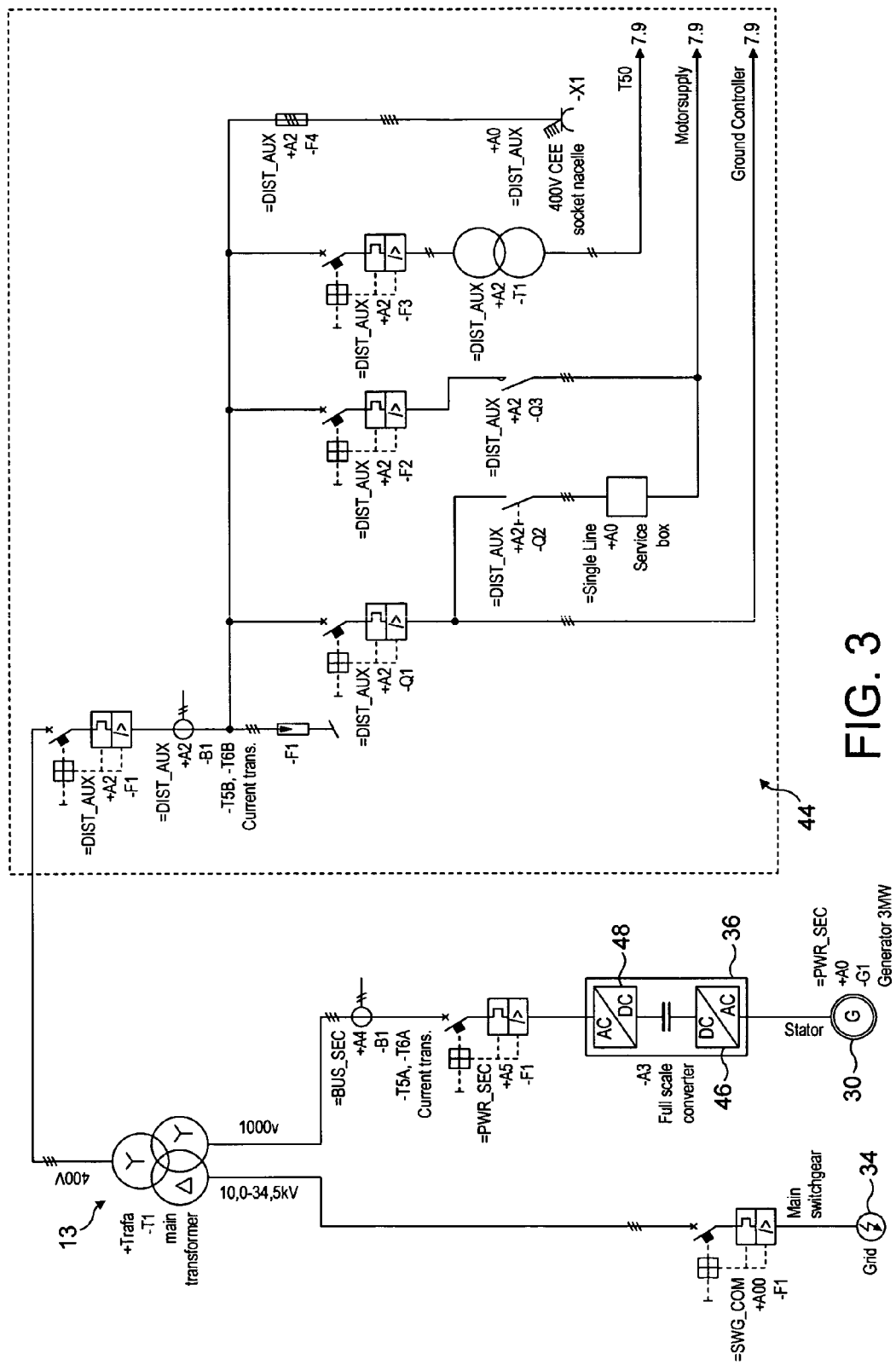
FIG. 3 is a circuit diagram, including a part of a prior art auxiliary component circuit, for the turbine of FIG. 1.

FIG. 3 is a circuit diagram of a prior art arrangement in a turbine 2, through which current is fed from the generator 30 to the auxiliary circuit 44 through the main transformer 13 in the turbine 2.

The frequency converter 36 is located between the generator 30 and the main transformer 13 and is important as it takes the somewhat irregular AC output of the generator 30 and converts it to a standard voltage and frequency AC supply suitable for manipulation by the transformer 12 and forwarding to the grid 34. Frequency converters 36 can come in a wide range of designs dependent on the grid needs and the characteristics of the specific generator 30 with which they are to be used. The one thing that they all have in common is an AC/DC converter or rectifier 46 arranged for coupling to a generator 30 and a DC/AC converter or inverter 48 for connection to a transformer 12, when in use. Again the standard requirements for and design of a common place frequency converter are well known in the industry.

Although included in this embodiment the frequency converter is not an essential component; as the generator may be directly connected to the grid.

The prior art auxiliary circuit described with reference to FIG. 3 can be utilised within a turbine farm in accordance with the present invention, with power being provided to the auxiliary circuit 44 via the main transformer 13 within each turbine 2 when appropriate and via the auxiliary transformer 60 when appropriate.

Each auxiliary component circuit 44 includes a plurality of components, including: lighting outlets, hydraulic pump or electric motor blade pitch mechanisms, yawing motors, a temperature control system, a lift, a brake, a turbine controller and a lubrication system, all o which are well known in the art.

Figure 4:
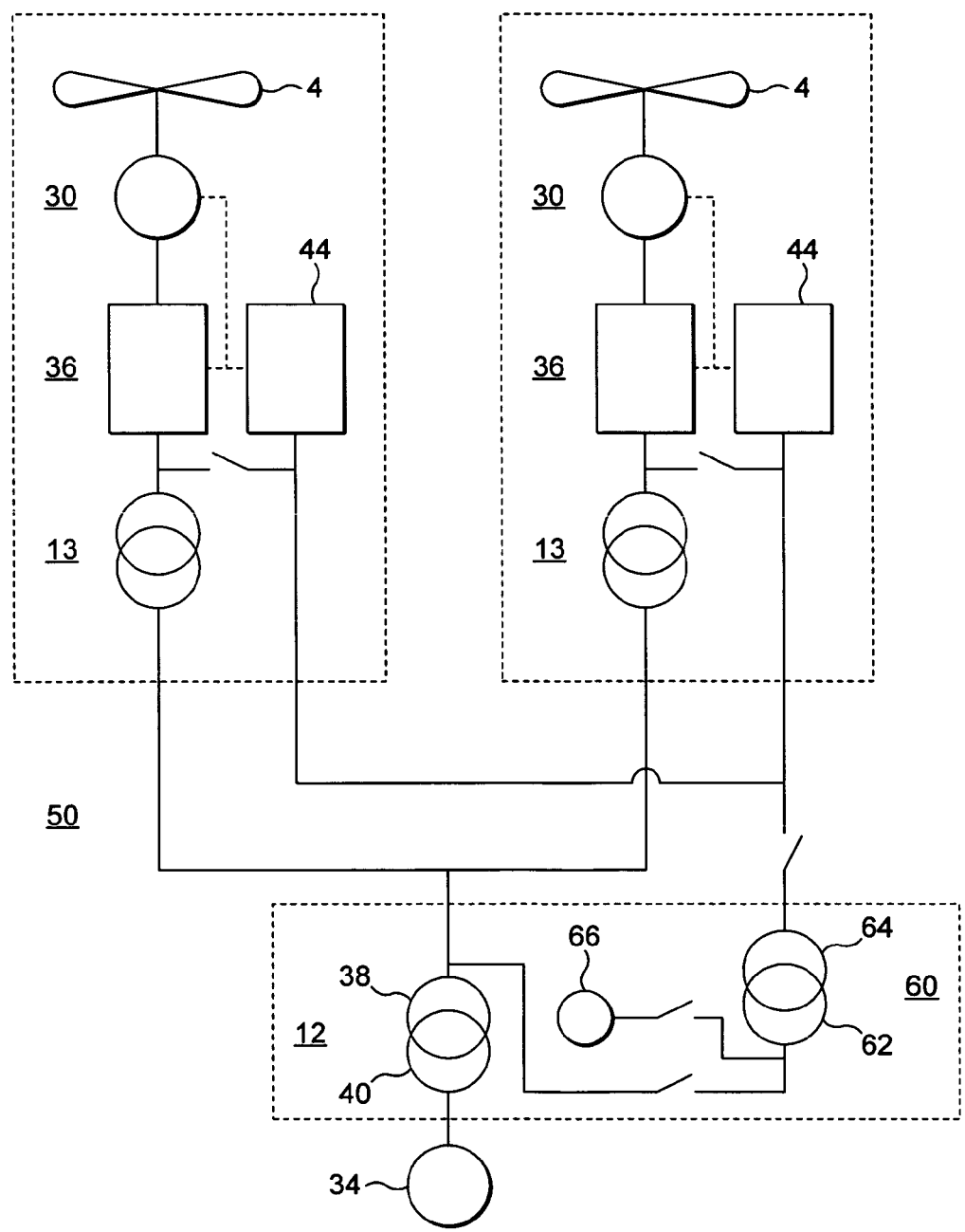
FIG. 4 is a circuit diagram of a wind farm in accordance with the present invention.

FIG. 4 illustrates a turbine farm circuit in accordance with the present invention. The sub-station transformer 12 therein is located in the main circuit remote from each individual turbine 2 in a wind farm 50. Also, the sub-station transformer 12 has only two sets of windings 38 & 40. Current from the generator 30, of each turbine 2, is fed to a first set of windings 38 of the sub-station transformer 12 and from a second set of windings 40 to the grid 34. However, unlike in the prior art, power is not transferred directly from the main transformer 13 of each individual turbine 2 to, and only to, the auxiliary component circuit 44 within that specific turbine 2.

Instead, as illustrated in FIG. 4, the sub-station transformer 12 output to the grid 34 via windings 40, is connected to an auxiliary component circuit transformer, known as an auxiliary transformer 60, via a first set of windings 62 therein. Power is then transmitted from the auxiliary transformer 60, via a second set of windings 64 therein, back to each and every turbine 2 in the turbine farm 50. Therefore, if any individual turbine 2 in the turbine farm 50, goes down the auxiliary component circuit 44 associated with that turbine 2 will still receive power. Clearly the power for that auxiliary circuit 44 is not produced by the downed turbine but from each of the remaining turbines in the wind farm 50. The remaining turbines in FIG. 4 can also receive power from the auxiliary transformer 60 if they are electrically connected thereto. However, if those turbines are electrically isolated from the transformer 60 then they will require their own auxiliary transformer (not shown) in order to benefit from the present invention. Therefore, for the present invention the term "wind farm" can be considered as all of the turbines, in a collection of turbines, which are connected to the same auxiliary transformer 60.

Hence, during construction of a turbine farm 50 power can be taken from the first turbine which has been erected and fed to the auxiliary component circuit 44 of each subsequently turbine to be erected. Also, as both the sub-station transformer 12 and the auxiliary transformer 60 require only two sets of windings they are significantly less expensive than transformers with three set of windings. Also, during a failure in any of the turbines in the wind farm 50 power can be routed to the turbine in question without waiting for the connection of a diesel generator or other back up power supply to that turbine, which would have to be transported to the wind farm 50. Therefore, fault diagnosis and correction is greatly enhanced with the auxiliary power circuit disclosed in a wind farm 50 in accordance with the present invention.

However, should a problem arise with the link to the grid 34 which cuts the output of the sub-station transformer 12 then a diesel generator 66 can be arranged to provide a source of power to the auxiliary circuits 44 within each turbine 2 in the farm 50. As this is an emergency arrangement the diesel generator 66 can also be arranged to be activated if a sensor (not shown) senses that power is not being transmitted by the sub-station transformer 12. Such a diesel generator 66 can be easily connected to the first windings 62 of the auxiliary transformer 60, as illustrated in FIG. 4.

Figure 5:
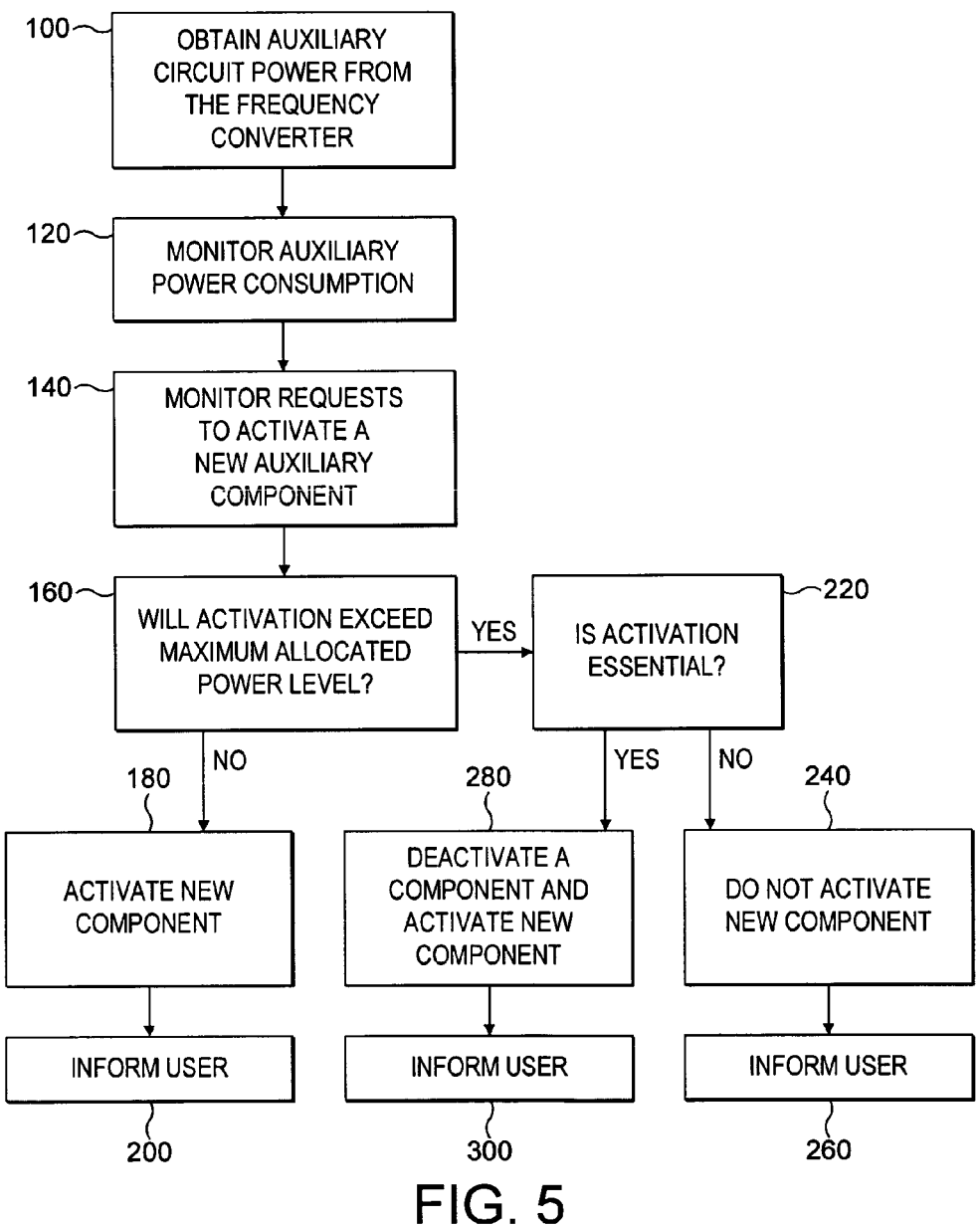
FIG. 5 is a flow diagram of a method of operation of the wind farm of FIG. 4 or individual turbines therein, in accordance with an aspect of the present invention.

FIG. 5 is a flow diagram illustrating a method of operation of each of the turbines 2, within the wind farm 50, as described above with reference to FIG. 4 and in particular it illustrates a method in which the operation of each of the components within the auxiliary component circuit 44 is controlled intelligently. The operation of each auxiliary component circuit 44 and the specific components therein is managed by the controller 16 or by a main controller 68, which is in communication with each controller 16 within each individual nacelle 8 of each turbine 2.

Firstly, for each and every turbine 2, power to operate the auxiliary circuit 44 is taken from the auxiliary turbine 60. Power consumption within the auxiliary circuit is monitored (box 120). A request for activation, automatically by the controller 16 or manually by an engineer within the nacelle 8, is monitored (box 140). If such a request is received a decision is made as to whether or not the additional power required to activate the component will exceed a predetermined minimum power and for how long (box 160). The length of time the power may exceed the limit may be merely the duration of use of the new component or there may be an additional component which the controller 16 is aware will be deactivated at a known future time, which is earlier than the expected deactivation time for the new component.

If the answer is "NO" the maximum power will not be exceeded, or the power will be exceeded but within safety parameters for an acceptable short period of time, then the new component is activated (box 180) and if the request came from a user the user is informed of the successful activation (box 200).

However, if the activation of the new component will exceed the maximum power, and it is expected to do so for a time period which is unacceptable then a decision is made as to whether or not activation of the new component is essential from a safety perspective (box 220). If the activation is not deemed to be essential then the new component is not activated (box 240). Again, if the request came from a user the user is informed of the unsuccessful activation of the new component (box 260).

Nonetheless, if the activation of the new component is deemed to be essential then the new component is activated, but only after the fast deactivation of a non-essential component, which was active at the time of the request (box 280), such that the result is activation of the new components but in a manner in which power consumption will not exceed the predetermined maximum for longer than the time deemed to be safe. Again if a user instigated the request then the user is informed of the outcome (box 300).

Informing the user may simply involve a light, for example a green light, being activated on the controller 16. Alternatively, if the request came from a source remote from the nacelle 8 then a telecommunications message may be sent to the user who instigated the request.

Safety requirements may mean that, for example, the yaw motor 22 is activated to yaw the nacelle 8 due to a sudden change in the wind conditions and that non-essential components are deactivated to allow that to happen.

Other requirements may mean that, for example, the hydraulic pitch needs to have sufficient reserve power, in an accumulator or some other way, to create a safe way to pitch the blades out of the wind if a wind gust occurs. Typically pitch systems can maintain a safe reserve of power for 2 to 3 minutes without the need to run the pitch pump. In these off periods the rest of the auxiliary system can be powered.

The most dominant users of power in a turbine are the yaw system, the pitch system and the brake system. These systems must be able to run without a major delay, whereas almost all other systems can wait for up to 10 minutes before needing to run.

Decisions on activation of specific components within the auxiliary component circuit 44 may be taken for reasons other than safety. For example, simple maintenance requirements may mean that certain components are required to be activated periodically. However, the system may merely ensure that only a minimum of those components are activated at the same time.

In its simplest form the intelligent activation of the auxiliary component circuit 44, may simply mean that all of the components of the circuit 44 are not activated at the one time or are not activated for more than a predetermined period of time.

The decision as to which components to activate in preference for others may be made in a number of ways. For example, the components of the auxiliary component circuit 44 may each be ranked in a look up table, held in the controller 16, in the order of their impact on safety or their importance. Lighting 26, for example, may be considered to be more important than a temperature control mechanism 54, but less important than yaw control 22.

To provide safe operation of the turbine the consumption of available power must be prioritized such that the runtime, vital nature of the use and typical use are known. During normal operation a yawing run takes less than 10 seconds, pitching the blades takes approximately 10 seconds and is required approximately every two minutes. In addition lubrication takes ten minutes and is required every twenty-four hours. Cooling and heating is dependent on ambient conditions but can easily be interrupted for periods of time without causing any problems for the running of the turbine.

Intelligent control of the turbine is set up based on three modes, dependent on the power being generated, namely: No production; Low production; and Full production. The systems which are operated and the order in which they are operated are different for different production criteria, as detailed in the table below.

The advantages of this intelligent control of individual turbines 2 can be greatly enhanced when the main controller 68 is utilized in order to coordinate the control of every auxiliary circuit 44 with the wind farm 50. For example, non-emergency operation of components within the auxiliary circuits 44 can be rotated such that all or a substantial number of the controllers 16 within individual turbines 2 do not attempt non emergency operations of auxiliary components at the same time.

Whilst the above description relates to wind turbines, this is by way of example only. The invention is applicable to any turbine system, such as oil fired or hydro-electric turbines or any other turbine used in electricity generation.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The methods described herein may be performed by software in machine readable form on a storage medium. The software can be suitable for execution on a parallel processor or a serial processor such that the method steps may be carried out in any suitable order, or simultaneously. This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local control processor and some at the remote computer (or computer network). Those skilled in the art will also

| | | | | System | | | | | |
|---|---|---|---|---|---|---|---|---|---|
| Mode | Yaw | Brake | Pitch | Cooling | Heating | Lubrication | Controller | Service lift | Light and outlets |
| No Production | Not critical | Critical | Not critical | Not critical | Important | Important | Critical | Important | Important |
| Low Production | Critical | Critical | Important | Important | Not critical | Important | Critical | Not critical | Not critical |
| Full Production | Critical | Critical | Critical | Critical | Not critical | Important | Critical | Not critical | Not critical | realize that by utilizing conventional techniques known to those skilled in the art that all, or a portion of the software instructions may be carried out by a dedicated circuit, such as a DSP, programmable logic array, or the like. The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The invention claimed is:

1. A turbine farm, comprising:
   a plurality of individual turbines, each comprising a respective auxiliary component circuit that includes a plurality of auxiliary components;
   a turbine farm main circuit coupled between the plurality of individual turbines and an electrical grid;
   an auxiliary transformer coupled between the turbine farm main circuit and the auxiliary component circuits, wherein the auxiliary transformer is arranged to transmit power received from the plurality of individual turbines to each auxiliary component circuit; and
   a controller configured to selectively activate each of the plurality of auxiliary components based on respective power requirements of each auxiliary component.

2. The turbine farm of claim 1, wherein the main circuit includes a sub-station transformer.

3. The turbine farm of claim 2, wherein each of the sub-station transformer and the auxiliary transformer comprise two sets of windings.

4. The turbine farm of claim 1, wherein the plurality of auxiliary components include one or more of a light source, a yaw motor, hydraulic pumps, lubrication systems and a power and temperature control mechanism.

5. The turbine farm of claim 1, further comprising a back up power supply configured to provide power to the auxiliary transformer.

6. The turbine farm of claim 5, wherein the back up power supply is a diesel generator configured to be activated automatically when power ceases to be transmitted to the auxiliary transformer by the turbine farm main circuit.

7. The turbine farm of claim 1, wherein the controller is further configured to permit only a subset of the auxiliary components of each auxiliary component circuit to be simultaneously activated, in order to reduce power consumption.

8. The turbine farm of claim 1, wherein the controller is configured to selectively operate the auxiliary components of all the auxiliary component circuits within the turbine farm collectively.

9. The turbine farm of claim 1, wherein each individual turbine is a wind turbine.

10. The turbine farm of claim 1, wherein the controller is further configured to selectively activate each of the plurality of auxiliary components based on a relative ranking of each auxiliary component of the auxiliary component circuit.

11. The turbine farm of claim 10, wherein the relative ranking is based on an importance to safe operation of the turbine.

12. A method of operating a turbine farm comprising a plurality of individual turbines each comprising a respective auxiliary component circuit that includes a plurality of auxiliary components, a turbine farm main circuit coupled between the plurality of individual turbines and an electrical grid, and an auxiliary transformer coupled between the turbine farm main circuit and the auxiliary component circuits, the method comprising:
   receiving power at the turbine farm main circuit,
   determining whether to activate at least one of the plurality of auxiliary components, based on power requirements of the at least one auxiliary component; and
   transmitting at least a portion of the received power to each individual turbine through the auxiliary transformer to power the respective auxiliary component circuit.

13. The method of claim 12, further comprising permitting only a subset of the auxiliary components of each auxiliary component circuit to be simultaneously activated, in order to reduce power consumption.

14. The method of claim 12, wherein determining whether to activate at least one auxiliary component comprises:
   monitoring power consumption of the auxiliary component circuit, and
   activating the at least one auxiliary component when the activation would not cause the power consumption to exceed a predetermined limit, or would not exceed the predetermined limit for more than a predetermined amount of time.

15. The method of claim 12, wherein activation and deactivation of auxiliary components within the auxiliary component circuits are collectively controlled across the turbine farm.

16. A non-transitory computer-readable medium comprising computer-executable instructions for operating a turbine farm, the turbine farm comprising a plurality of individual turbines each comprising a respective auxiliary component circuit that includes a plurality of auxiliary components, a turbine farm main circuit coupled between the plurality of individual turbines and an electrical grid, and an auxiliary transformer coupled between the main circuit and the auxiliary component circuits, the instructions comprising:
   determining whether to activate at least one of the plurality of auxiliary components, based on power requirements of the at least one auxiliary component; and
   transmitting at least a portion of power received at the turbine farm main circuit to power the auxiliary component circuits through the auxiliary transformer.

17. The computer-readable medium of claim 16, wherein the instructions include permitting only a subset of the auxiliary components of each auxiliary component circuit to be simultaneously activated, in order to reduce power consumption.

18. The computer-readable medium of claim 16, wherein determining whether to activate at least one auxiliary component comprises:
   monitoring power consumption of the auxiliary component circuit, and
   activating the at least one auxiliary component when the activation would not cause the power consumption to exceed a predetermined limit.

19. The computer-readable medium of claim 16, wherein determining whether to activate at least one auxiliary component comprises:
   monitoring power consumption of the auxiliary component circuit, and
   activating the at least one auxiliary component when the activation would not cause the power consumption to exceed a predetermined limit for more than a predetermined amount of time.

20. The computer-readable medium of claim 16, wherein activation and deactivation of auxiliary components within the auxiliary component circuits are collectively controlled across the turbine farm.

* * * * *